US00RE40159E

(19) United States
(12) Reissued Patent
Udelhofen et al.

(10) Patent Number: US RE40,159 E
(45) Date of Reissued Patent: Mar. 25, 2008

(54) BATTING HELMET

(75) Inventors: Patrick Udelhofen, Chicago, IL (US); Douglas G. Guenther, Wheaton, IL (US)

(73) Assignee: Wilson Sporting Goods Co., Chicago, IL (US)

(21) Appl. No.: 29/261,126

(22) Filed: Jun. 6, 2006

Related U.S. Patent Documents

Reissue of:
(64) Patent No.: Des. 491,316
Issued: Jun. 8, 2004
Appl. No.: 29/188,963
Filed: Aug. 27, 2003

U.S. Applications:
(62) Division of application No. 29/173,174, filed on Dec. 23, 2002, now Pat. No. Des. 479,367.

(51) LOC (8) Cl. ..... 29-02
(52) U.S. Cl. ..... D29/106
(58) Field of Classification Search ..... D29/102, D29/104–107, 112, 122; 2/6.6, 410, 411, 2/414, 417, 421, 422–425
See application file for complete search history.

(56) References Cited

U.S. PATENT DOCUMENTS 3,042,927 A * 7/1962 Mauro et al. ..... 2/418
D309,512 S * 7/1990 Crow ..... D29/105
D371,224 S * 6/1996 Carlson et al. ..... D29/102
D385,662 S * 10/1997 Paglucci et al. ..... D29/105
D389,958 S * 1/1998 Kinkead ..... D29/102
D402,414 S * 12/1998 Smith ..... D29/106
6,128,786 A * 10/2000 Maddux et al. ..... 2/418

* cited by examiner

*Primary Examiner*—Ruth McInroy
(74) *Attorney, Agent, or Firm*—Terence P. O'Brien

(57) CLAIM

We claim the ornamental design for a batting helmet, as shown and described.

DESCRIPTION

FIG. 1 is a front perspective view of a batting helmet showing our new design;
FIG. 2 is a side elevation view thereof;
FIG. 3 is a top plan view thereof; and,
FIG. 4 is front elevation view thereof.
The ornamental design that is claimed is shown in solid lines in the drawings. The broken (dashed) lines shown in FIGS. 1 through 4 are included only for the purpose of illustrating environmental elements, and form no part of the claimed design.

1 Claim, 4 Drawing Sheets

Matter enclosed in heavy brackets [ ] appears in the original patent, but forms no part of this reissue; matter printed in italics indicates the additions made by reissue.

Amended

Amended

Amended

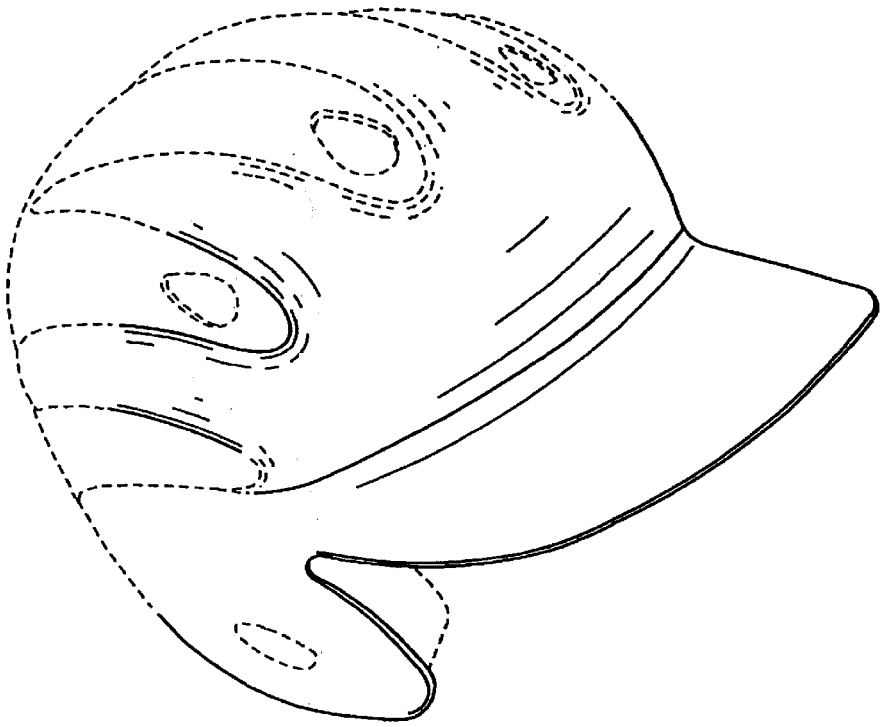
FIG. 1
Amended

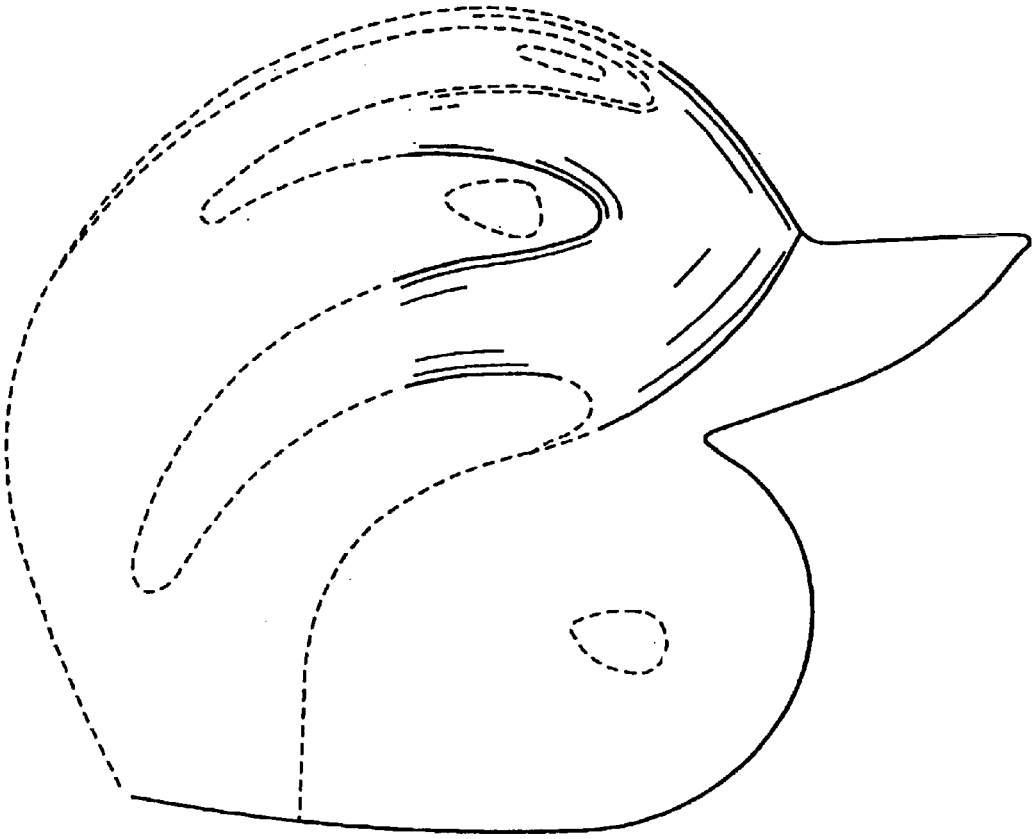
FIG. 2
Amended

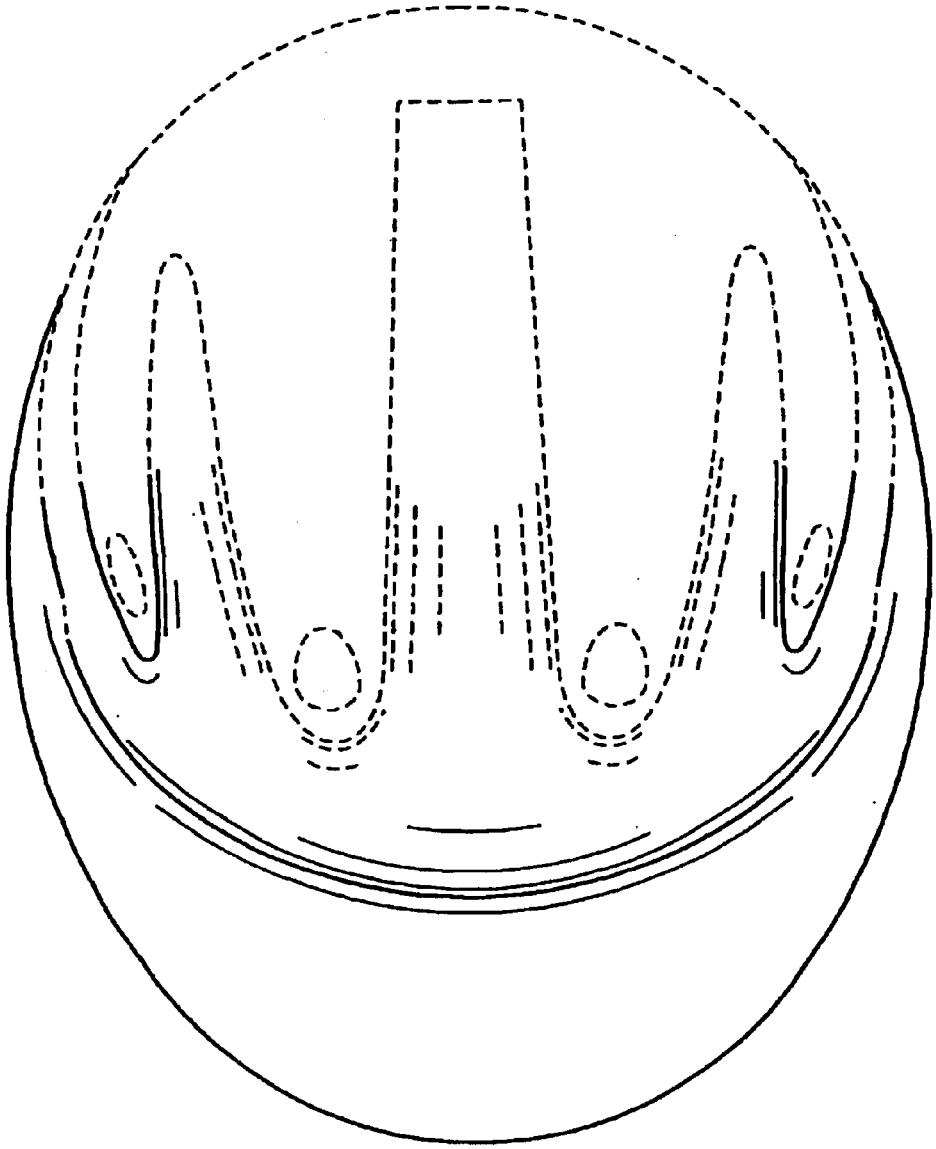
FIG. 3
Amended

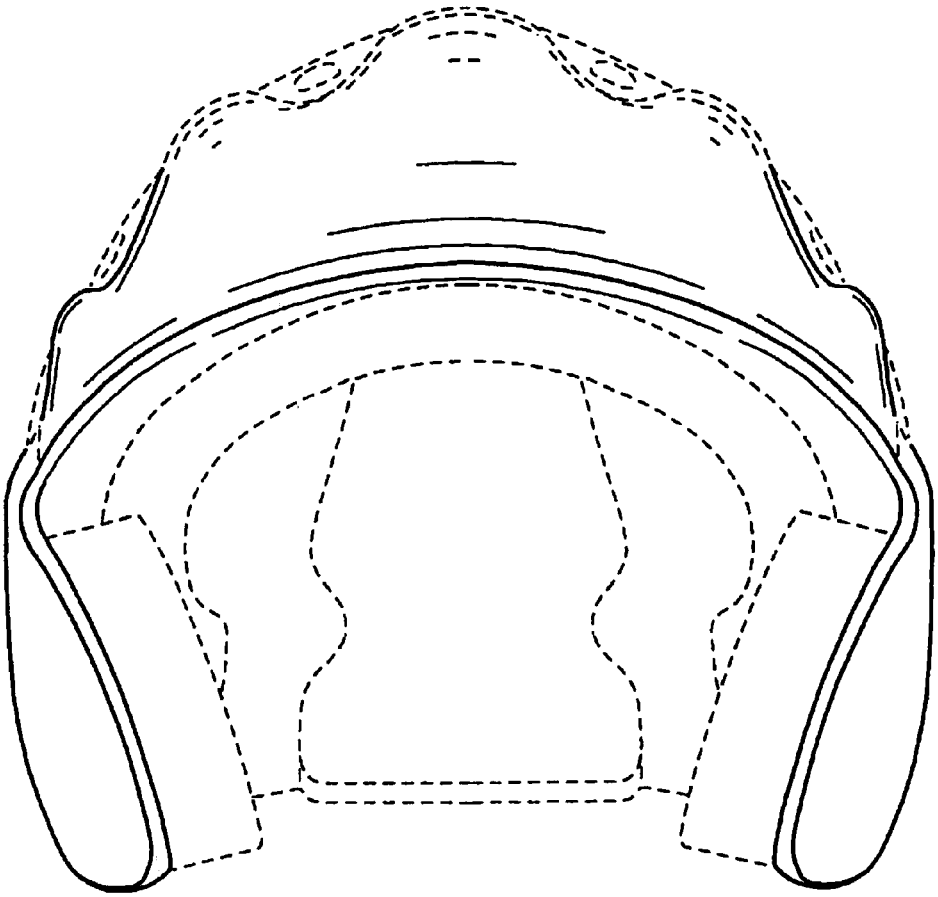
FIG. 4
Amended